Figure 5:
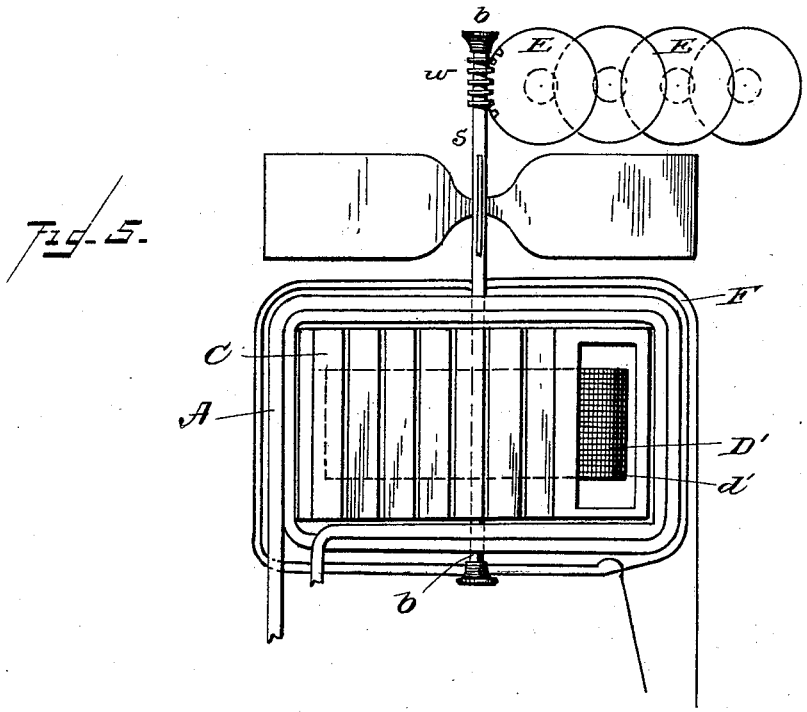

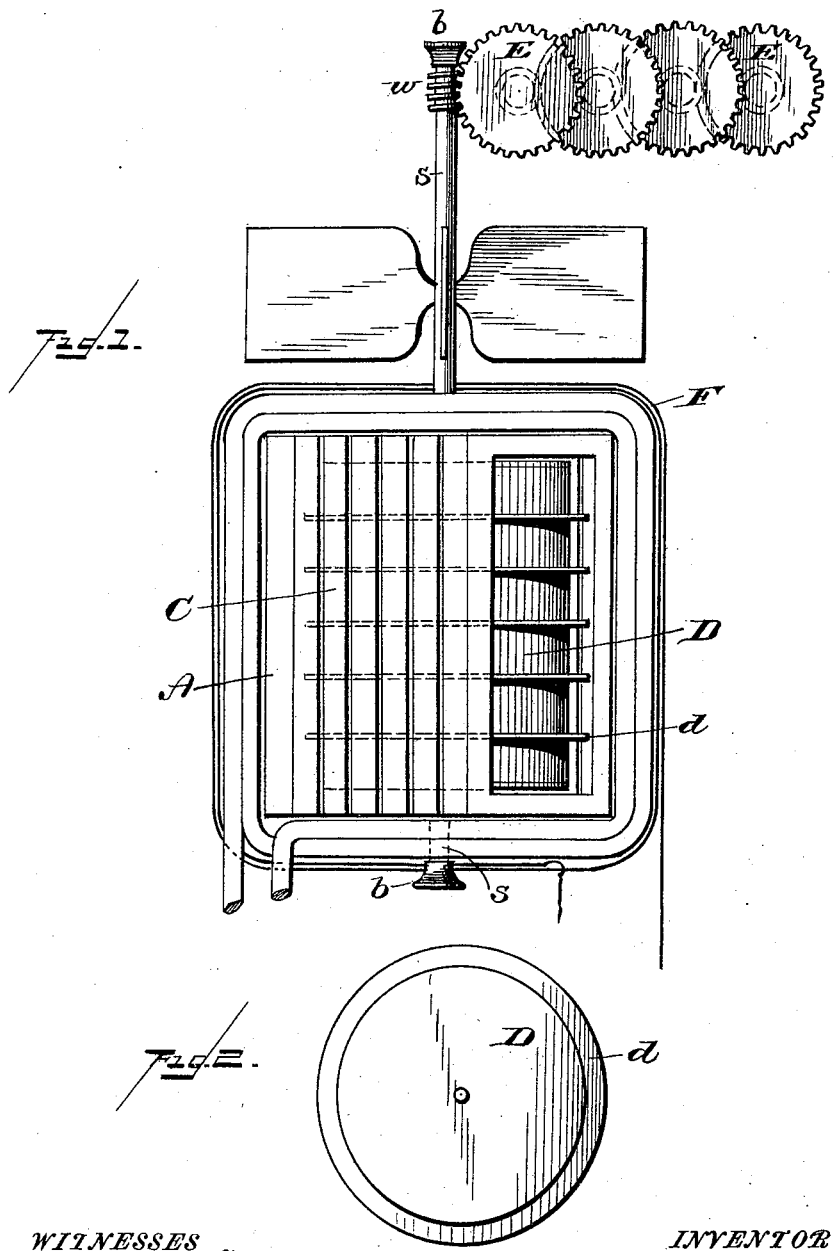

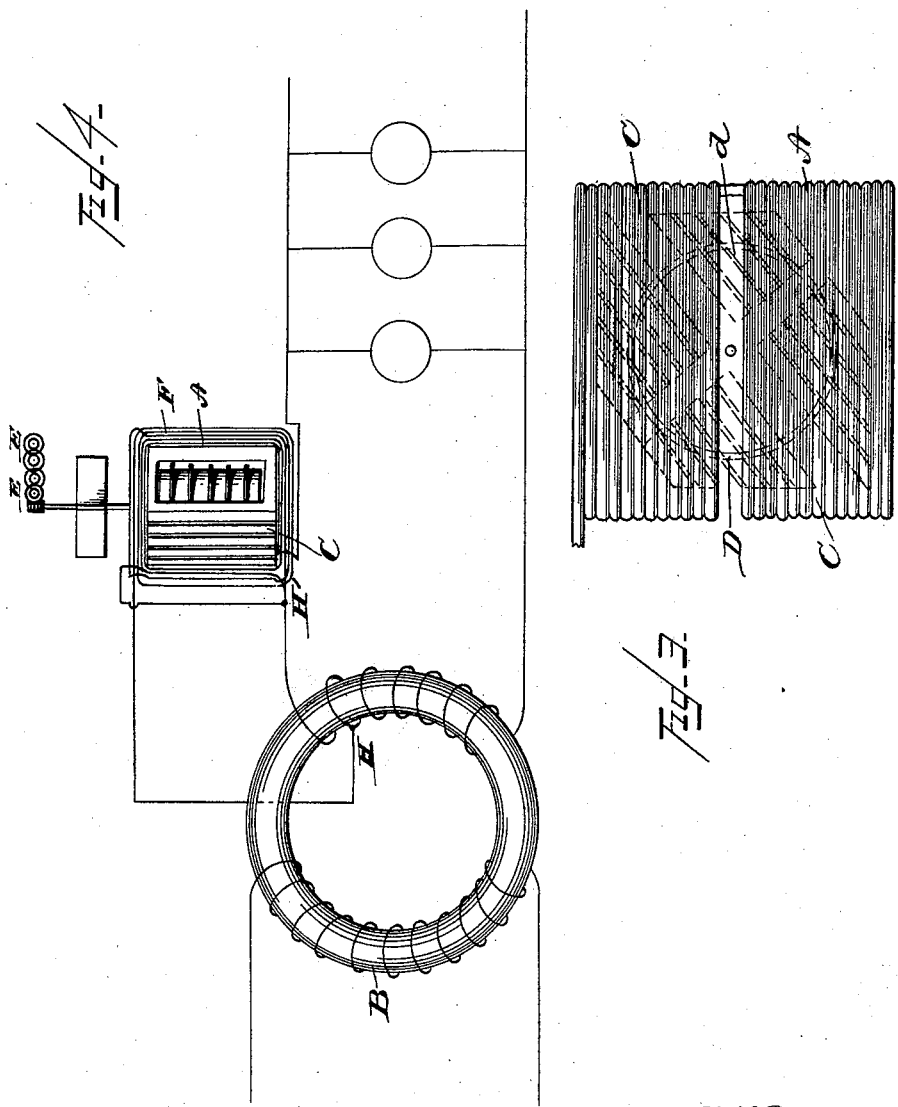

(No Model.) 3 Sheets—Sheet 3.

M. M. M. SLATTERY.
ELECTRIC METER.

No. 407,619. Patented July 23, 1889.

WITNESSES
F. L. Ourand.
W. A. Smith.

INVENTOR
Marmaduke M. M. Slattery
By R. S. Taylor
His Attorney

UNITED STATES PATENT OFFICE.

MARMADUKE M. M. SLATTERY, OF FORT WAYNE, INDIANA, ASSIGNOR TO THE FORT WAYNE ELECTRIC LIGHT COMPANY, OF SAME PLACE.

ELECTRIC METER.

SPECIFICATION forming part of Letters Patent No. 407,619, dated July 23, 1889.

Application filed March 14, 1889. Serial No. 303,216. (No model.)

*To all whom it may concern:*

Be it known that I, MARMADUKE M. M. SLATTERY, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

My invention consists in certain improvements in electric meters, more especially for the purpose of obtaining initial action of the apparatus with a small number only in action of the devices employed for the utilization of current, and in which the energy consumed is to be measured.

The form of meter to which my present improvement relates is one which is adapted to the measurement of alternating currents, and the following description will be confined to such form, though I do not thereby intend to restrict myself in the application of the methods or devices herein described.

The meter which is shown in the drawings consists of a coil or helix connected with some source of alternating current; a second coil or conductor of low resistance closed upon itself, independent of the first coil, and disposed angularly with reference thereto, and a revolving cylinder of non-magnetic conducting material having disks of magnetic material surrounding and attached to the same and revolving therewith in their own plane, such cylinder having its axis of rotation at or near the point of intersection of the planes of the two coils, to which is added the shunt-coil, hereinafter particularly described. This particular form of actuating mechanism is here shown as an illustration of the best application of my invention known to me; but it can be applied to a meter in which the moving part is an iron armature alone, or a conducting cylinder, disk, or coil alone, or in any other form.

In meters of this class a difficulty has been experienced in obtaining rotation of the armature with a very small current, as the inductive field produced may be insufficient to overcome the inertia of the movable parts, and consequently current may pass through the apparatus without being registered or paid for by the consumer. This is due to the fact that with a meter of given form a certain number of ampère-turns is required to obtain the inductive effect necessary to rotation, while it is important at the same time not to make the convolutions in the main coil connected with the source of current too numerous, on account of thereby introducing injurious resistance into the circuit. To avoid these difficulties I employ a shunt or derived circuit from the circuit of the first coil, disposed, preferably, in like manner thereto, and having a greater number of convolutions than the main coil, and conducting only a small proportion of the total current. As these meters are intended to be used in the secondary circuit of a converter or transformer operated by alternating currents, this shunt or derived coil might be placed immediately between the secondary terminals of such converter. In such case, however, a large number of turns of wire would be necessary in the shunt, in order to prevent more than a small current passing, or extraneous resistance would have to be provided, either of these alternatives involving loss of energy and waste. I prefer to tap the secondary coil itself by connecting the terminals of the shunt-coil thereto, so that only a certain section or portion of the coil is inductively operative upon the shunt, which is consequently working at a lower potential than the main coil, and receives its proper current without the interposition of useless resistance introduced to meet excessive potential.

Figure 6:
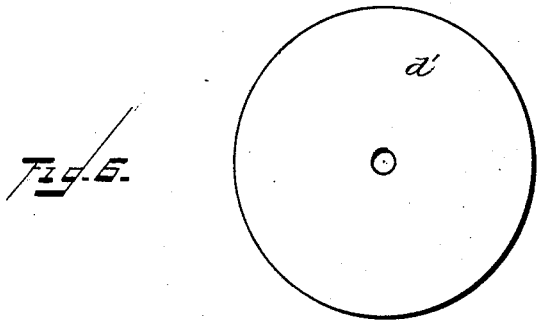

In the drawings, Figure 1 is an elevation of the meter; Fig. 2, a section of cylinder and disks; Fig. 3, a plan view of the coils partly in section; Fig. 4, a diagram of the connections. Figs. 5 and 6 illustrate the application of my invention to a meter having an iron armature.

A is the first coil, connected with some source of alternating current, which may be a converter, as conventionally represented at B.

C is the second coil, closed upon itself; D, the revolving cylinder, with its disks $d$; E E E, gear-wheels operated by a worm $w$ on the cylinder-shaft $s$, revolving in bearings $b$ $b$ and carrying pointers which move over suitable dials.

F is the shunt-coil connected with B at the points H H'.

The following figures, used for the sake of illustration merely, and not necessarily accurate, will serve to explain: Assume that the coil A has twenty turns, and that one ampère passing around the coil is insufficient to produce rotation, but that fifty ampère-turns are sufficient. The pressure at which the current flows being in this connection immaterial, let the converter-coil be tapped at such a point that a difference of potential of one volt will be obtained between the terminals of the shunt-coil. Then wind the shunt-coil with two hundred turns of wire of such cross-section that the resistance of the coil shall be four ohms. Then only one-fourth of an ampère will circulate in the shunt-coil, thus furnishing the required fifty ampère-turns, but at the cost of only one-quarter of a watt of energy. From this it will be seen that by this means initial action of the meter can be obtained in a very simple and economical manner.

It will be understood that when the current exceeds a predetermined limit the main coil will receive sufficient current to assume its normal action, and the proportion of current flowing through the shunt will be so small as to be practically negligible. Some retarding device, preferably a fan, as shown in the drawings, has to be employed to regulate the speed of revolution of the cylinder.

It is obvious that the particular form of the mechanism to which the shunt-coil is applied is not material to my invention. It is desirable that the stationary closed coil shall be of low resistance, and I have shown such a coil made of copper bars or a copper shell cut into ribs as the best form of that coil within my knowledge; but it may be made of wire or otherwise. I believe the best form of the moving part to be a copper cylinder carrying iron disks mounted on its circumference, as shown in Fig. 1; but the cylinder may be used without the disks, or the disks may be used without the cylinder. In the latter case the iron disks are superposed one above the other, with a thin insulation between them, if desired, so as to constitute an iron armature. This form of construction is shown in Figs. 5 and 6, in which D' is the iron armature and $d'$ one of the thin iron disks of which it is built up. In either of these forms in which an electrical conductor is used for the moving part it may be made of copper wire instead of the copper cylinder which I have shown.

I claim—

1. An electric meter consisting of a fixed coil traversed by alternating currents, a second coil the circuit of which is closed upon itself, fixed in inductive relation with said first coil and with its plane intersecting the plane of the first coil, a moving part consisting of a closed electrical conductor free to rotate placed in inductive relation with the two fixed coils aforesaid, a shunt-coil in a circuit derived from points in the circuit of the first-named coil having a difference of potential between them less than that operating in the circuit of the first-named coil and superadded to said first-named coil, and a retarding and regulating device and registering mechanism.

2. In an electric meter for alternating currents, the combination of a coil connected with a source of alternating current, a fixed closed coil or conductor whose plane is disposed angularly toward the plane of said first coil and in inductive relation therewith, a moving part free to rotate placed in inductive relation with both said coils, and consisting of a cylinder of diamagnetic conducting material whose axis is the axis of rotation, with disks of magnetic material attached thereto whose planes are in the plane of rotation, and a derived or shunt circuit of a lower potential than that between the terminals of the working-circuit, so disposed as to re-enforce the inductive action of the first and second coils upon the moving part, together with a retarding and regulating device and registering mechanism.

3. In an electric meter for measuring alternating currents containing a primary inducing-coil, a secondary inducing-coil, and a moving part actuated by induction from said coils, a shunt-coil in a circuit of lower potential than that between the terminals of the working-circuit, so disposed as to assist the primary coil for initial action.

In testimony whereof I do hereto subscribe my name, in the presence of two witnesses, this 1st day of March, 1889.

MARMADUKE M. M. SLATTERY.

Witnesses:
J. E. TALBOT,
CHARLES C. MILLER.